US005717954A

United States Patent [19]
Grieff et al.

[11] Patent Number: 5,717,954
[45] Date of Patent: Feb. 10, 1998

[54] LOCKED EXCHANGE FIFO

[75] Inventors: Thomas W. Grieff, Spring; William C. Galloway, Houston; Jeff M. Carlson, Cypress, all of Tex.

[73] Assignee: Compaq Computer Corporation, Houston, Tex.

[21] Appl. No.: 542,801

[22] Filed: Oct. 13, 1995

[51] Int. Cl.⁶ .................................................. G06F 5/06
[52] U.S. Cl. .................................... 395/877; 395/872
[58] Field of Search ........................... 395/872, 876, 395/877, 436, 437, 457, 458, 459, 250, 481, 485

[56] References Cited

U.S. PATENT DOCUMENTS

| | | | |
|---|---|---|---|
| 4,298,954 | 11/1981 | Bigelow et al. | 395/250 |
| 4,449,182 | 5/1984 | Rubinson et al. | 395/250 |
| 4,486,854 | 12/1984 | Yuni | 395/427 |
| 4,873,666 | 10/1989 | Lefebvre et al. | 365/189.07 |
| 4,922,437 | 5/1990 | Sakata et al. | 364/514 |
| 4,942,553 | 7/1990 | Dalrymple et al. | 395/250 |
| 5,241,630 | 8/1993 | Lattin, Jr. et al. | 395/287 |
| 5,276,847 | 1/1994 | Kohn | 395/490 |
| 5,280,584 | 1/1994 | Caesar et al. | 395/250 |
| 5,295,246 | 3/1994 | Bischoff et al. | 395/250 |
| 5,390,299 | 2/1995 | Rege et al. | 395/250 |
| 5,450,546 | 9/1995 | Krakirian | 395/250 |
| 5,561,823 | 10/1996 | Anderson | 395/872 |

FOREIGN PATENT DOCUMENTS

| | | | |
|---|---|---|---|
| 312239 A2 | 4/1989 | European Pat. Off. | G06F 5/06 |
| 537397 A1 | 4/1993 | European Pat. Off. | G06F 5/06 |

OTHER PUBLICATIONS

MC68020 32-Bit Microprocessor User's Manual, Second Edition, Prentice-Hall, pp. B-54, B-55, D-8 to D-11, 1985.
"Understanding Clocked FIFO's", Cypress Semiconductor Corporation, 1994.
Mano, M. Morris, Digital Design, pp. 432 and 447-449, 1984.
Wenniger, B.G., "Using the CY7C44X and CY7C45X FIFOS at 70 MHZ", Electro International Conference Record, vol. 16, Apr. 16, 1991, pp. 147-151, p. 149.

Primary Examiner—Tod R. Swann
Assistant Examiner—Conley B. King, Jr.
Attorney, Agent, or Firm—Pravel, Hewitt, Kimball & Krieger

[57] ABSTRACT

A FIFO with locked exchange capability is disclosed. The FIFO has a memory for storing and retrieving data submissions, a write address generator and a read address generator for sequentially addressing the memory. A difference counter maintains the difference between the number of writes to the queue and reads from the queue. The net difference, as tracked by the counter is a measure of the FIFO utilization. To detect the queue full condition, a comparator compares the maximum FIFO stack depth against the counter output. The result of this comparison is latched and provided to a write strobe generator so that, in a subsequent write operation, if the FIFO is full, the write strobe from the producer is blocked and the data will not be written to the FIFO. Otherwise, the write strobe from the producer is passed to the memory. Additionally, a remaining space count is maintained in a status register. During operation, a bus master performing the read-modify-write cycle to the FIFO reads the status register to find the available space in the FIFO and immediately writes the data to the FIFO. If the read returns a zero, indicating that the FIFO is full, the bus master requeues the data for another read-modify-write cycle as it knows that the data has not been stored in the FIFO.

43 Claims, 9 Drawing Sheets

LOCKED EXCHANGE FIFO

BACKGROUND OF THE INVENTION

1. Field of the Invention

The present invention relates in general to a data buffer, and more particularly, to a first-in-first-out (FIFO) buffer with a locked exchange capability.

2. Description of the Related Art

Although every new generation of microprocessor has delivered an impressive leap in performance over the previous generation, more processing power is still needed by many applications. To meet this insatiable need for greater processing capability, computer architects are applying a number of techniques, including multiprocessing and parallel-processing, which essentially deploy a number of processors to process one or more tasks simultaneously. An increase in processors ideally results in a corresponding increase in computer power, assuming the tasks can be allocated to minimize interprocessor communication and coordination costs. In addition, computer architects are distributing intelligence at the input/output level by endowing computer peripherals with one or more microprocessors. The use of intelligent peripherals conserves host processor resources since the local microprocessors perform specific functions that the host processors would otherwise be required to perform.

A peripheral with a dedicated processor is discussed in U.S. Pat. No. 5,101,492, entitled DATA REDUNDANCY AND RECOVERY PROTECTION, issued to Schultz, et al., and assigned to the assignee of the present invention. Schultz discloses a personal computer having a fault tolerant, intelligent disk array controller system capable of managing the operation of an array up to eight standard integrated disk drives without supervision by the computer host. Communication ports are provided for submitting a command list and for notifying the host of the completion of requested jobs. Through these ports, a host processor can transmit one or more high level commands to the disk system and retrieve the results from the local processor overseeing the disk sub-system after the local processor has collected the data from the disk drives. The local microprocessor, on receiving this request, builds a data processing structure and oversees the execution of the command list. Once the execution of the command list is finished, the local processor notifies the operating system device driver to indicate to the requesting bus master that its request has been performed. The local processor in Schultz thus off-loads the disk management function from the host processor.

In a system with multiple processors or bus masters, provisions for allocating resources as well as responsibilities among various processors are needed. Further, the synchronization mechanism has to guarantee that the bus masters do not modify the resource at the same time. In other words, a mutual exclusion between system resources such as the ports needs to be guaranteed under certain circumstances. Techniques that improve multi-processor communication efficiency are of great importance because they allow lower cost microprocessors and components to perform work that previously required the use of more expensive mainframes and minicomputers. Increased multiprocessing efficiency, therefore, leads directly to computer system designs that have lower cost, improved performance, or both.

Prior art solutions to the communication/synchronization problem in a multiprocessing system typically utilize semaphores and work queues. A semaphore is a special flag corresponding to an individual resource to control accessing rights in order to prevent mutual interference. Traditionally, a register or a memory location is used as a semaphore flag.

In using the semaphore, a bus master reads the semaphore flag. If the flag is clear, the bus master sets the semaphore flag to lock the resource and then accesses the resource. Once the bus master is done with the resource, it clears the semaphore flag so that other processors or tasks can have access to the resource. To ensure an orderly manner of setting and clearing the semaphore, the semaphore is accessed and changed in an indivisible operation, also known as a test and set (TAS) or exchange operation.

Similar in concept to the semaphore, the work queue resides at a predefined address and provides a convenient place for the bus masters to drop off their requests, which may be high level commands or requests to the resource. Typically, the work queue is organized as a first-in-first-out (FIFO) queue so that each processor's requests can be processed in the order of submission, although other sequencing arrangements are also known in the art. To place a request in the work queue, the requesting processor queries a work queue pointer to determine whether or not the queue has sufficient space to accept another request. If the queue is full, the bus master waits a period of time and rechecks the queue. Once the queue has space available, the bus master submits the request. Once the requested job has been completed, the result is communicated to the requesting processor in a number of ways, including interrupting the requesting bus master with a pointer to the results generated. Alternatively, the pointer to the results may be placed in a status queue for the processors to interrogate and determine the status of the request. However, this need to first query for space availability and then write the actual data takes time and delays entry of the data or job into the work queue. It is desirable to increase the efficiency of this operation. Additionally, if multiple bus masters are addressing a single work queue, semaphore operations must be provided to central access to the queue, thus even further increasing the overhead to provide data, as now the semaphore must be checked before the work queue status can be checked. It would be further desirable to avoid the need for this semaphore operation when multiple bus masters are present.

SUMMARY OF THE INVENTION

A FIFO with locked exchange capability is provided with a memory for storing and retrieving data submissions. Command pointer data is written to the FIFO command pointer port by asserting a write strobe. Command pointer data is transferred or read from the FIFO whenever a previous command has been completed and the command pointer data can be written to a command pointer. For each FIFO access, a difference counter maintains the difference between the number of writes to the queue and reads from the queue by decrementing the difference output on each data read and incrementing the difference output on each assertion of the write strobe. The net result from the counter is a measure of the fullness of the FIFO. A remaining space value for the FIFO is computed by subtracting the difference output from the maximum FIFO stack depth. The remaining FIFO space is provided as the data obtained in response to a read operation of the command pointer port. This difference of operation of the command pointer port allows use of a read/modify/write or exchange operation to the port. In the exchange operation, the bus master first receives the remaining FIFO space value and then writes the command pointer data in a locked operation. This locked operation prevents another bus master from intervening. Therefore, a semaphore operation is not necessary. Therefore, if the bus master performs the exchange operation and receives a zero space remaining indication, the bus master can assume that the command pointer data was not accepted, as the FIFO was already full.

However, because the FIFO can be read at any time, it is possible that the FIFO is full at the time the FIFO answers the requesting bus master's read of the command pointer port, but immediately after answering the read, space in the FIFO becomes available due to an intervening operation whereby a data item is removed, or popped, from the FIFO stack before the write portion of the exchange operation. In this event, the FIFO would store the write operation into the recently freed-up space, even though the FIFO had previously indicated to the requesting processor that it was full. Eventually, the bus master would erroneously resubmit its request not knowing that the previous exchange cycle had in fact already stored the command pointer data in the FIFO. This would erroneously result in the command being performed twice.

To remedy this potentially erroneous condition, the FIFO full output indication is latched and provided to a write strobe generator so that, in the subsequent write operation, if the FIFO was indicated to be full, the write strobe is blocked and the data will not be written to the memory of the FIFO. Therefore, the bus master's assumption will remain correct. The locked nature of the exchange operation ensures that no other bus master will be able to perform a write before the bus master which read the full status performs its command pointer data write.

During operation, a bus master reads the status of the FIFO to find the available space in the FIFO and then immediately writes the data to the FIFO. If the result of the status read equals zero, indicating that the FIFO was full, the bus master requeues the data since the data has not been accepted by the FIFO. Alternatively, if the result of the status read is greater than zero, the bus master knows that its submission has been accepted.

By ensuring that the FIFO does not accept the write operation from the requesting processor even if the FIFO space was available subsequent to the status read of the FIFO, a locked exchange FIFO is provided for a reliable submission of data, with the exchange operation preventing interruption by another bus master. Thus, the need to perform a semaphore operation is removed as is the need to query for space and then write the data. A simple exchange operation is used, thus increasing efficiency, as desired. Other objects, features, and advantages of the present invention will be apparent from the accompanying drawings and from the detailed description that follows below.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
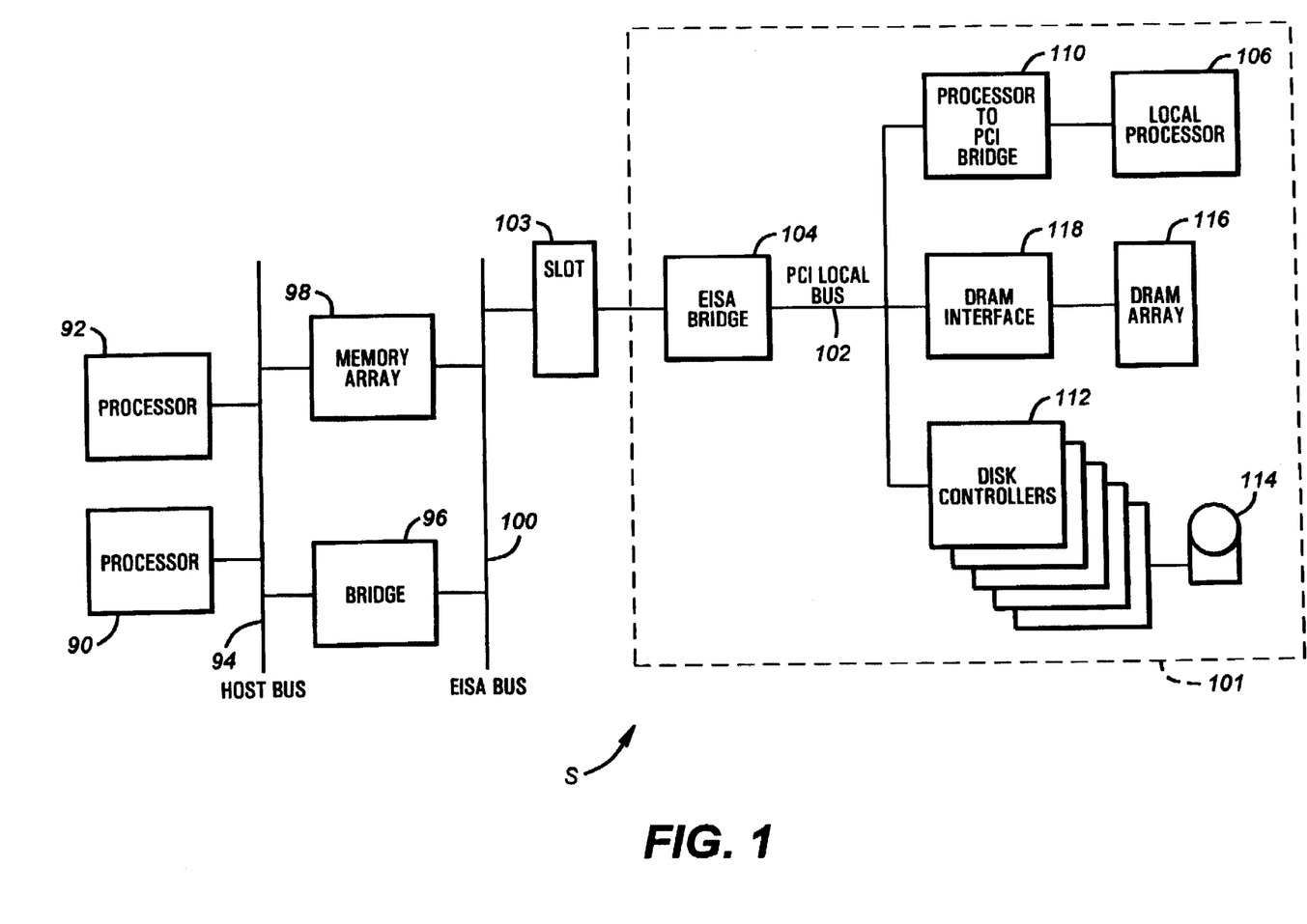
FIG. 1 is a block diagram of a disk array system containing the locked exchange FIFO of the present invention.

Turning to the drawings, FIG. 1 discloses a block diagram of a computer system S having an intelligent disk array system 101 containing a FIFO with locked exchange capability. For purposes of illustration only, and not to limit generality, the invention will be described with reference to its operation within a disk array system.

The computer system S has a plurality of host processors 90 and 92. These host processors are connected to a host bus 94. The host bus 94 is a relatively high speed bus in comparison with a peripheral bus 100, preferably an EISA bus, which is provided to interface the system S with a plurality of peripherals. A memory array 98 is positioned between the host bus 94 and the EISA bus 100. Additionally, a host bus to EISA bus bridge 96 is placed between the two buses to transfer data from one bus to the other. The EISA bus has one or more slots 103, upon which the disk array system is connected to. Although the bus 100 is illustrated as being an EISA bus, it may alternatively be a PCI bus, or any other suitable buses.

During the operation of the computer system, the bus master issues I/O requests, such as disk read and write requests, to the intelligent disk array system 101 to request that data be transferred over the EISA bus 100. The EISA bus 100 is connected to an EISA bridge 104, which is connected to the disk array system via a PCI local bus 102. The dual bus hierarchy of FIG. 1 allows for concurrent operations on both buses. The EISA bridge 104 also performs data buffering which permits concurrency for operations that cross over from one bus into another bus. For example, an EISA device could post data into the bridge 104, permitting the PCI local bus transaction to complete independently, freeing the EISA bus 100 for further transactions.

The PCI local bus 102 is further connected to a processor to PCI bridge 110. The other side of the processor to PCI bridge 110 is connected to a local processor 106 which oversees the operation of the intelligent disk array system 101, including the caching of the disk data, among others. The processor to PCI bridge 110 interfaces the local processor 106 to the local PCI bus 102 to provide host access to the local processor support functions and to enable the local processor to access resources on the PCI bus 102. The bridge 110 performs a number of functions, including big endian to little endian format conversions, interrupt controls, local processor DRAM interfacing, and decoding for the local processor ports, among others.

The PCI local bus 102 is also connected to a DRAM interface 118, which in turn is connected to a DRAM memory array 116. The DRAM interface 118 and the DRAM memory array 116 can support either a 32 or a 64-bit data path with a parity protected interface and/or an 8-bit error detection and correction of the DRAM array data. The DRAM array 116 provides a buffer which can serve, among others, as a disk caching memory to increase the system throughput. In addition to supporting the DRAM array 116, the DRAM interface 118 supports three hardware commands essential for drive array operations: memory to memory move operation, zero fill operation and zero detect operation. The memory to memory move operation moves data from system memory 98 to a write cache located in the DRAM array 116 during write posting operations. Also, on cache hits to previously posted data still residing in cache, a bus master in the DRAM interface 118 is programmed to move the data in the write cache to the system memory 98. Further, the movement of data located within the DRAM array 116 is supported by the DRAM interface 118. The second hardware command supporting drive array operations is a zero-fill command, which is used to initialize the XOR buffer for RAID 4 and 5 operations. Finally, the DRAM interface bus master supports a zero detect operation, which is used in RAID 1, RAID 4, and RAID 5 operations to check redundant disk data integrity.

The PCI local bus 102 is also connected to one or more disk controllers 112 which is further connected to a plurality of disk drives 114. Each of the plurality of disk controllers 112 is preferably configured for a small computer systems interface (SCSI) type interface and operate as PCI bus masters. As shown in FIG. 1, the local processor 106 may, through the processor to PCI bridge 110, access the DRAM array 116 via the DRAM interface 118 or the disk drives 114 via the disk controllers 112. Similarly, a host processor can, through the EISA bus 100 and through the EISA bridge 104, access the PCI local bus 102 to communicate with the processor to PCI bridge 110, the DRAM interface 118, or the disk controllers 112 to acquire the necessary data.

During operation, the host processor 90 sets up one or more command descriptor blocks (CDBs) to point to a host command packet in the memory array 98. The host processor 90 writes the address of the CDB to the processor to PCI bridge 110 preferably using an exchange operation, with the processor to PCI bridge 110 storing the CDB in a command FIFO, which is preferably a locked exchange FIFO according to the present invention. The processor to PCI bridge 110 then retrieves the CDB from the memory array 98 into a command list FIFO in the processor to PCI bridge 110 and informs the local processor 106 that a command list is available for processing. The local processor 106 parses the command list for commands. The local processor 106 then builds CDBs in the DRAM memory array 116 for each command. Next, the local processor 106 issues requests or command pointers for the local CDBs to the DRAM interface 118 as necessary to read or write data to the memory array 98 or other host memory. The local processor 106 issues these command pointers for the local CDBs to a locked exchange FIFO according to the present invention. The DRAM interface 118 then performs the operations indicated in the local CDBs.

Figure 2:
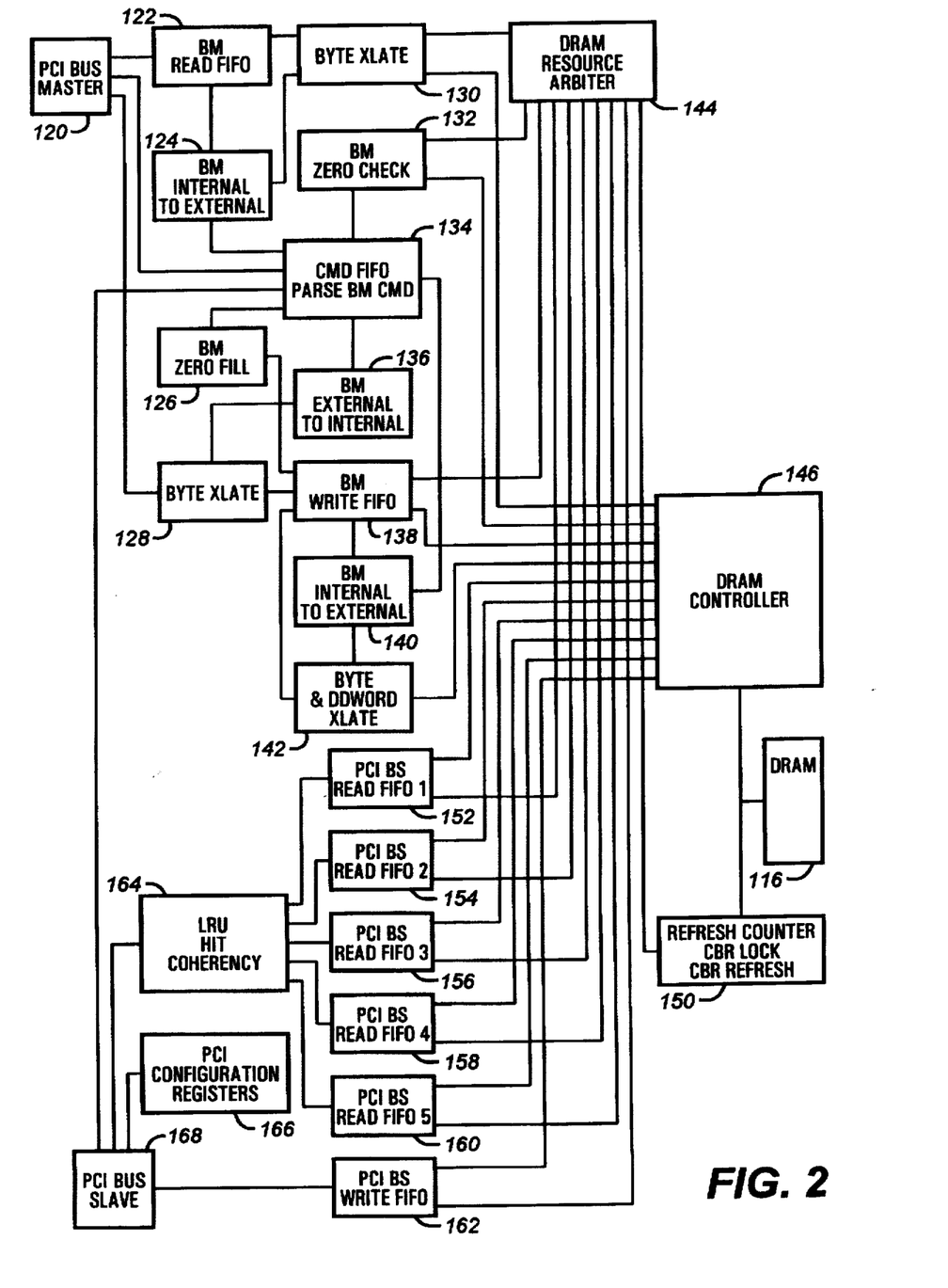
FIG. 2 is a block diagram of the DRAM interface of FIG. 1.

FIG. 2 shows in more detail the DRAM interface 118. In the upper portion of FIG. 2, a PCI bus master 120 is connected to a bus master read FIFO 122 which buffers data to the bus master. The bus master 120 is also connected to a command FIFO 134 which accepts and parses commands for operation by the bus master. The bus master 120 is further connected to a byte translate block 128 which performs the necessary byte alignment operations between the source and destination. A bus master internal to external move controller 124 is connected to the bus master read FIFO 122 and to a second byte translate block 130. The bus master internal to external move controller 124 handles operations where data is transferred to host memory 98 from the internal DRAM array 116. The bus master internal to external move controller 124 is connected to the command FIFO 134 to receive operational control. The outputs of the byte translate block 130 are connected to a DRAM resource arbiter 144 and a DRAM controller 146 to enable the bus master 120 to directly access the DRAM array 116.

The command FIFO block 134 is also connected to control a bus master zero fill block 126, which in turn is connected to a bus master write FIFO 138. The command FIFO block 134 is also connected to control a bus master zero check block 132 which is connected to the DRAM resource arbiter 144 and the DRAM controller 146. The zero fill block 126 supports the zero-fill command, which is used to initialize an XOR buffer in memory to zero values for RAID 4 and 5 operations. The zero check block 132 supports the zero detect operation, which is used in RAID 1, RAID 4, and RAID 5 operations to check redundant disk data integrity.

To support the memory move commands inside the DRAM array 116, the command FIFO block 134 is connected to a bus master internal to internal move controller 140. The internal to internal move controller 140 handles transfers from one location in the DRAM array 116 to another location in the DRAM array 116. The command FIFO block 134 also controls a bus master external to internal move controller 136, which controller 136 transfers data from host memory 98 to the internal DRAM array 116. The translate blocks provide byte alignment. The byte translate block 128 is connected to the bus master external to internal controller 136 as well as the bus master write FIFO 138. The bus master write FIFO 138 is connected to a byte and double word translate block 142 as well as the bus master internal to internal move controller 140. The internal to internal move controller 140 is connected to the byte and double word translate block 142, whose output is connected to the DRAM controller 146. The bus master write FIFO 138 is connected to the DRAM controller 146, and the DRAM resource arbiter 144 for buffering and translating the data transfers between the bus master 120 and the DRAM array 116. Thus the described circuits facilitate the transfer of data between the DRAM array 116 and the bus master 120.

The lower portion of FIG. 2 shows in more detail a block diagram of a PCI bus slave. In FIG. 2, a PCI bus slave 168 is connected to the command FIFO block 134, a least recently used (LRU) hit coherency block 164, a plurality of PCI configuration registers 166 and a PCI bus slave write FIFO 162. The PCI bus slave write FIFO 162 is a speed matching FIFO that allows for the posting of writes by the bus slave 168.

The PCI configuration registers 166 are registers for storing the configuration of the DRAM interface 118. These registers contain information such as vendor identification, device identification, command, status, revision identification, class code, cache line size, I/O register map base address, memory register map base address, DRAM memory base address, DRAM configuration register, and refresh counter initialization settings, among others.

The LRU hit coherency block 164 provides a local script fetching mechanism which effectively provides a read ahead coherent cache to minimize the wait time on the disk controllers 112 when fetching instructions or data from the DRAM array 116. The LRU hit coherency block 164 is connected to a plurality of bus slave read FIFOs 152–160. Each of the read FIFOs 152–160 is in turn connected to the DRAM resource arbiter 144 and the DRAM controller 146. Upon a read hit, data from the read FIFOs can be immediately provided to the bus slave 168 to improve system throughput. In the event of a read miss, the FIFO buffer follows an adaptive replacement policy, preferably the least recently used algorithm, to ensure optimal performance in multi-threaded applications. To ensure coherency of the data stored in the read FIFOs, all memory accesses are locked to the DRAM controller 146 through the PCI bus slave 168. Thus, as long as a PCI bus master is connected to the PCI bus slave 168, all writes to the DRAM 116 will be blocked to ensure coherency of information associated with the read FIFOs during the slave transfer. Further, any time the bus slave 168 is inactive, the LRU block 164 snoops writes to the DRAM controller 146 to determine if invalidation cycles to the read FIFOs 152–160 are needed.

The refresh counter 150 provides various refresh cycles to the DRAM array 116, including CAS BEFORE RAS (CBR) refresh cycles. The CBR refresh cycles are stacked two-deep such that a preemption of an on-going access occurs only when that cycle is at least two refresh periods long. The refresh counter block 150 is also connected to the DRAM resource arbiter 144 to ensure that the refresh cycles to the DRAM array 116 are not untimely delayed.

The DRAM resource arbiter 144 controls all requests to access the DRAM. The resource arbiter 144 provides the highest priority to requests from the CBR refresh counter block 150, followed by requests from the bus slave write FIFO 162, followed by requests from the read FIFO banks 152–160, and finally requests from the bus master command FIFO 134.

The CP FIFO register is located in the command pointer FIFO 134 and may be accessed by a bus master via the PCI bus slave 168, which connects with the command FIFO block 134 to provide a communication channel between the bus master and the controller. The CP FIFO register has a read access mode in which the remaining data words that can be written into the FIFO are provided. It also has a write access mode where the address of the next CDB or command pointer can be inserted into the FIFO 134. The value read from the command pointer FIFO register indicates the number of command pointers that can be accepted by the controller: a value of zero from the CP FIFO register indicates that the CP FIFO 134 is full and that the CP FIFO 134 will not accept another command pointer, while a non-zero value from the CP FIFO register indicates that the bus master can submit that many command pointers consecutively without having to read the FIFO 134 to verify the availability of space in the FIFO 134. Consequently, the CP FIFO register should be read before submitting the first command and before each time the number of consecutive CDB submissions equals the value last status read from the CP FIFO register.

In addition, when the CP FIFO register is read, the FIFO remaining count indication is latched and subsequent writes to the CP FIFO register will not update the memory of the CP FIFO 134 unless the previous read of the CP FIFO register indicated that the CP FIFO 134 is not full and can accept another command pointer.

A second FIFO called a command completion pointer (CCP) FIFO provides a channel for the bus master to receive notifications of a completed command list from the intelligent disk array system. The CCP FIFO can preferably hold up to sixteen double words, each of which is the address of an individual command list that has been completed by the controller. When read, the CCP FIFO register will either return the address of a completed command list or a value of zero. A value of zero indicates that none of the requested commands has been completed at the time of the status read. When a non-zero value is read from this register, the value returned is the address of a completed command list.

Figure 3:
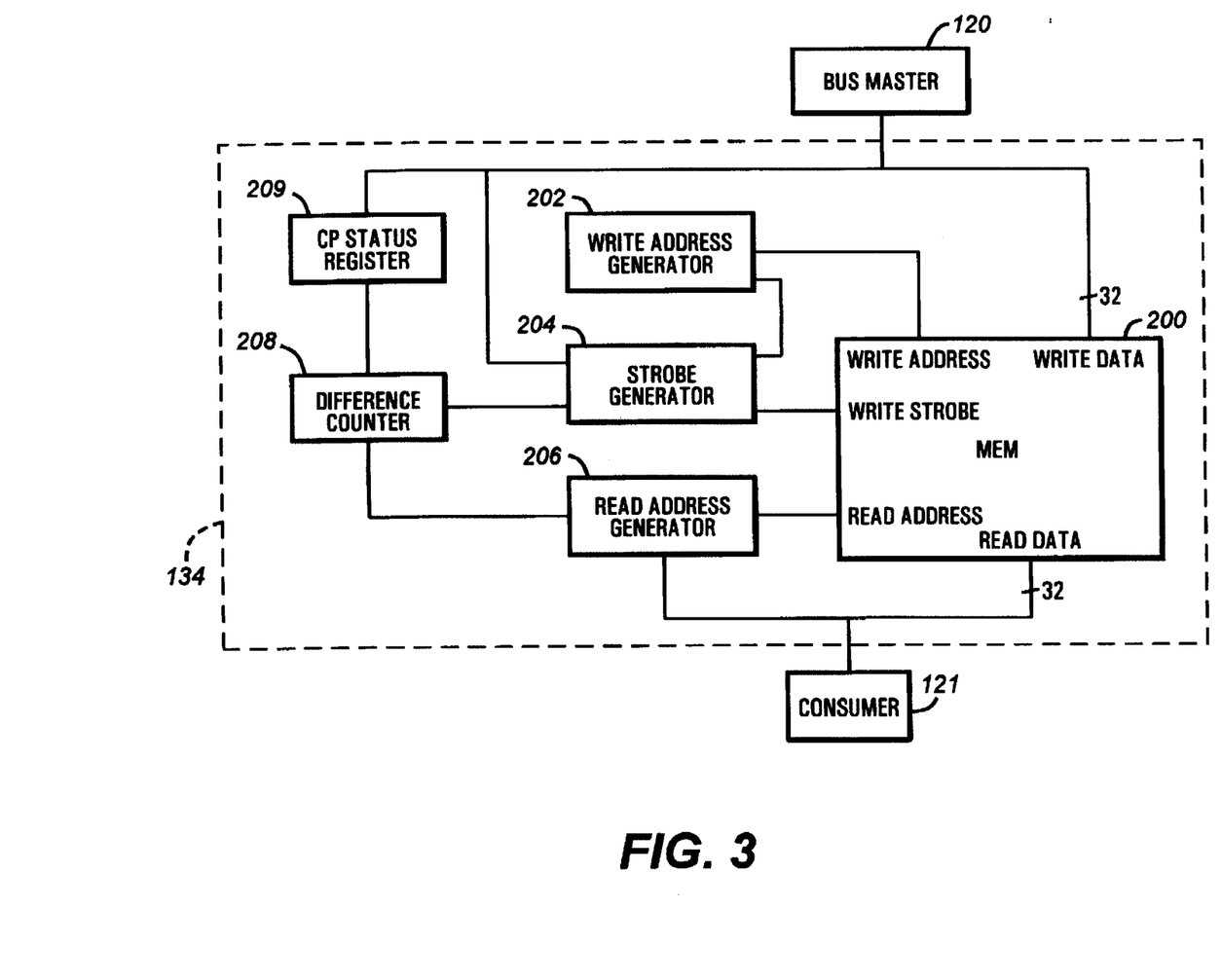
FIG. 3 is a block diagram of the command pointer FIFO of FIG. 2.

Turning to FIG. 3, the command pointer FIFO 134 of FIG. 2 is shown in more detail. In FIG. 3, a bus master 120, or the producer, is connected to one side of the FIFO 134, while a consumer 121 is connected to the other side of the FIFO 134. The bus master 120 produces data by writing to the FIFO 134 while the consumer 121 consumes data by reading from the FIFO 134. The consumer 121 reads data from the FIFO 134 by asserting a read strobe signal which is received by the read input of a memory 200. The bus master 120 is also connected to the write data bus of the memory 200, to a write strobe generator 204, and to a CP status register 209. Preferably, the memory 200 is a 16 position, 32 bit wide memory which acts as the FIFO data storage. On the other side of the FIFO 134, the consumer 121 is connected to the read data bus of the memory 200 and a read signal of the read address generator 206. The read address generator 206 drives the read address input to the memory 200 to deliver the next data in the FIFO 134 to the consumer 121. The read address generator 206 is also connected to a difference counter 208 whose output is provided to the CP status register 209 to provide the remaining FIFO space value to the bus master 120 upon a read of the CP FIFO status register 209. Additionally, the difference counter 208 is also connected to the write strobe generator 204. Thus, the difference counter 208 monitors consumer read operations as well as producer write operations to detect the full condition in the FIFO 134. Thus, the CP FIFO status register 209 is the read portion of the previously described CP FIFO register. The output of the difference counter 208 and the write signal from the bus master 120 are provided to the write strobe generator 204 to generate the write strobe for the memory 200. The strobe generator 204 detects and latches the FIFO full condition and generates a write strobe to the memory 200 when the bus master 120 writes to the FIFO 134 and the FIFO 134 was not full during the last query of the CP status register 209. Thus, the write operation to the memory 200 is the write portion of the CP FIFO register previously described. When a write to the memory 200 occurs, the strobe generator 204 also causes the write address generator 202 to increment and point to the next available memory location to be written. Also, each write to the address generator 202 increases the output from the difference counter 208 by one until the utilized space count output preferably reaches sixteen, upon which the FIFO 134 is full.

On the other side of the memory 200, a consumer interface is provided so that the command pointer FIFO 134 can be read by a consumer 121. A read address generator 206 increments the read address every time the consumer 121 reads from the FIFO 134. Each read from the FIFO 134 removes a data element from the memory 200 and thus decreases the difference counter 208 output to reduce the utilized space count by one until the count reaches zero, upon which the FIFO 134 is empty. Thus, the difference counter 208 computes the difference between the number of writes and the number of reads. The output of the difference counter 208 is subtracted from the maximum stack depth value, preferably sixteen, to generate an output to the CP status register 209 indicating the remaining FIFO 134 memory locations. The difference counter 208 output is also latched and gated with the next write signal to prevent data from being written to the memory 200 in the event the FIFO 134 is full during the last CP FIFO register read access.

Figure 4:
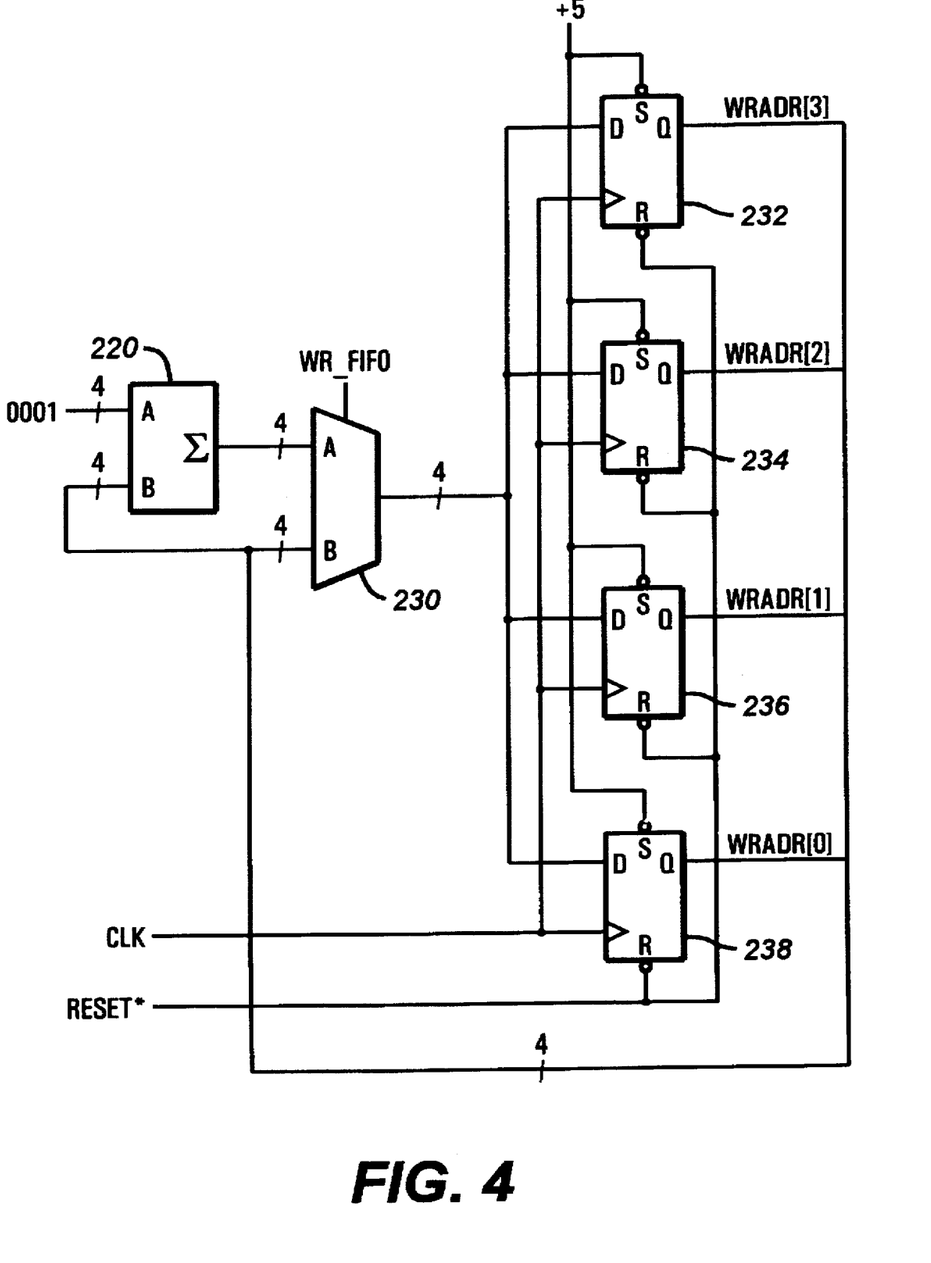
FIG. 4 is a block diagram of the write address generator of FIG. 3.
Figure 5:
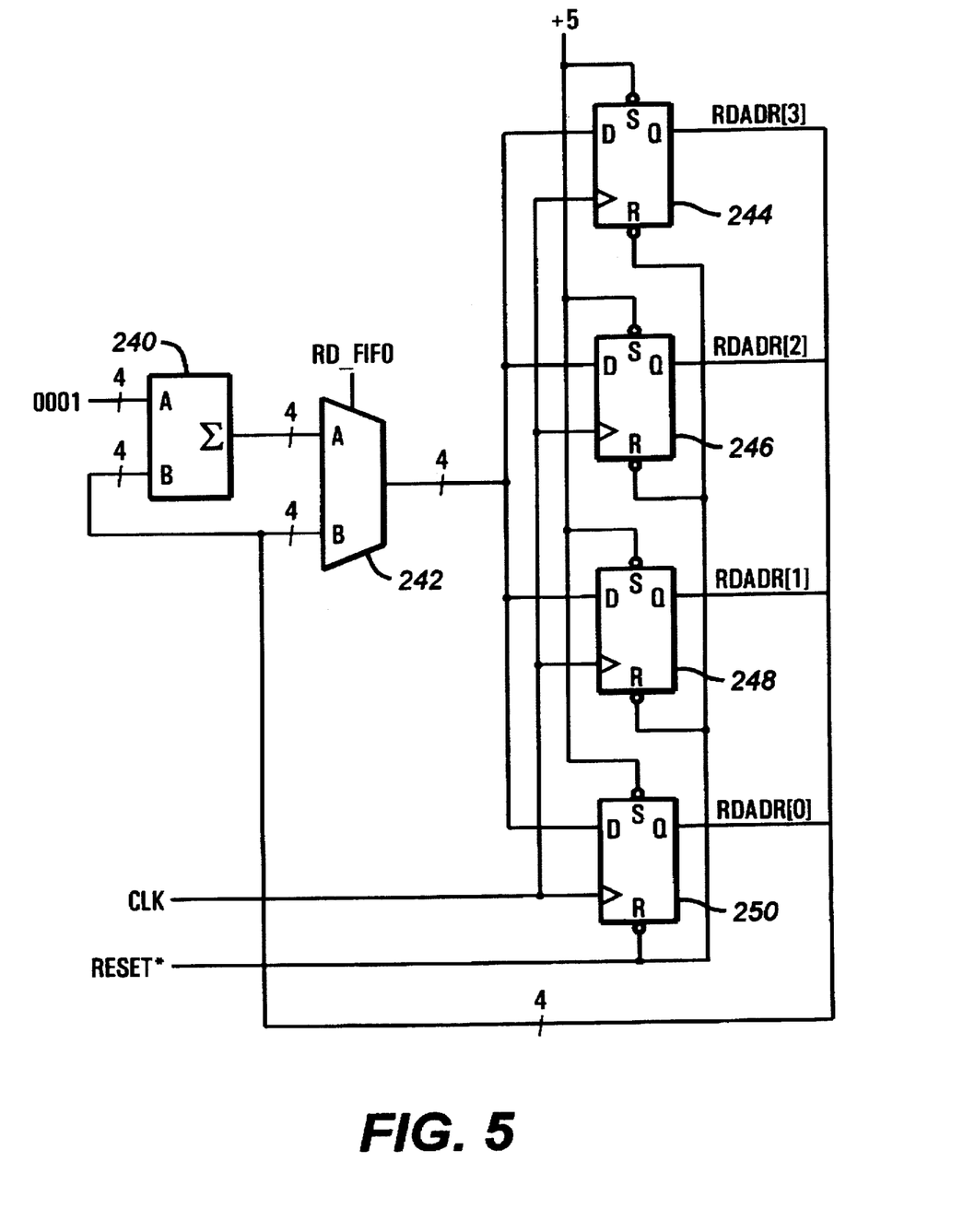
FIG. 5 is a block diagram of the read address generator of FIG. 3.

FIGS. 4 and 5 disclose in more detail the write address generator 202 and the read address generator 206 of FIG. 3. For each push operation, or a FIFO write, the write address generator 202 increments a write address pointer to address the next location in the memory 200. Similarly, for each pop operation, or a FIFO read operation, the read address generator 206 increments the read address pointer to address the next space in the memory 200.

Turning to FIG. 4, a circuit for generating the write address signals is disclosed. In FIG 4, the current write address value is stored in a plurality of flip-flops 232–238. The set input of the flip-flops 232–238 is tied to a logic high, while the reset input of the flip-flops 232–238 is collectively connected to the RESET* signal to clear the flip-flops 232–238 upon reset. Further, a clock signal CLK is connected to the clock input of the flip-flops 232–238. Upon power-up, the write address is cleared to zero by the RESET* signal. The outputs of the flip-flops 232–238 are presented to an address incrementer 220, which is essentially an adder with one input preset to one and the other input connected to the current write address output of the flip-flops 232–238. The output of the address incrementer 220 is provided to a multiplexer 230. The multiplexer 230 is selected using the write strobe signal WR_FIFO from the strobe generator 204.

During a write cycle, the output of the address incrementer 220 is coupled to the input of the write address flip-flops 232–238. During all other times, the current write address information is cycled back to the inputs of the flip-flops 232–238.

The address incrementer 220 takes the address output and adds one to it to increment the address pointer. The output of the address incrementer 220 is provided to the other input of the multiplexer 230. The multiplexer 230 is gated by the write strobe signal so that, upon a write, the incremented address is provided to the inputs of flip-flops 232–238 to be latched, or alternatively, to provide the current write address when operations other than writes are directed at the FIFO 134.

Turning to FIG. 5, the circuit for generating the read address bus is disclosed. In FIG. 5, an address incrementer 240 uses an adder with one input preconfigured to one and the other input connected to the current read address. The output of the address incrementer 240 is provided to a multiplexer 242. During a read cycle, the output of the address incrementer 240 is coupled to the input of read address flip-flops 244–250. The set input of the flip-flops 244–250 is tied to a logic high, while the reset input of the flip-flops 244–250 is collectively connected to the RESET* signal. A clock signal CLK is connected to the clock input of the flip-flops 244–250. Upon power-up, the read address is cleared to zero by the reset signal. The multiplexer 242 is gated by the read enable signal RD_FIFO so that, upon a read, the incremented address is provided to the flip-flops 244–250 to be latched in, or alternatively, when read operations are not being performed, the current read address value is looped back.

Figure 6:
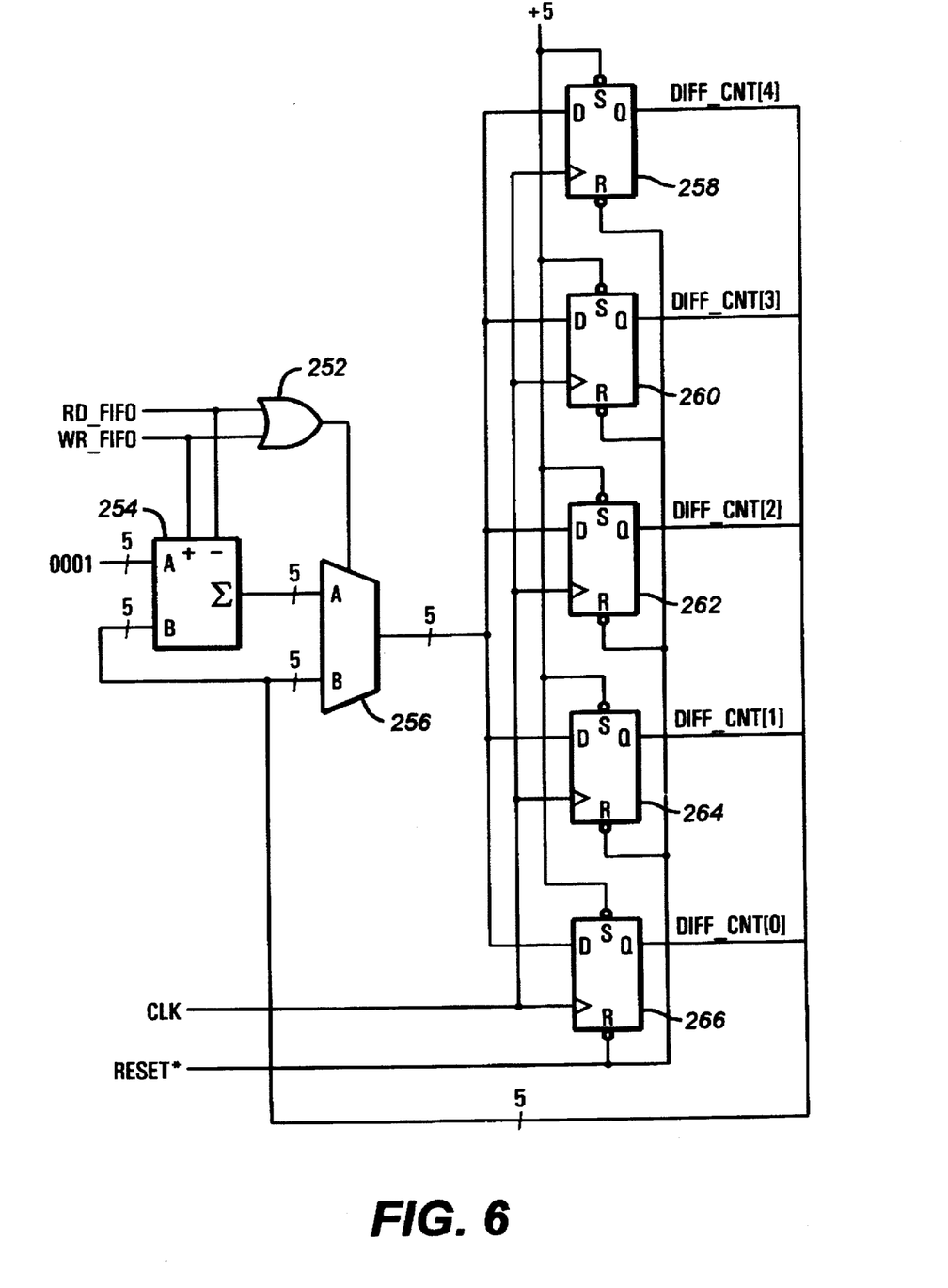
FIG. 6 is a block diagram of the differential counter of FIG. 3.

FIG. 6 shows in more detail the difference counter 208 of FIG. 3. In FIG. 6, a differential count generator 254 tracks the differences between the number of reads and writes to the FIFO 134 and thus keeps count of the usage of the FIFO 134. The differential count generator 254 is essentially an adder/subtractor with one input prewired to one and the other input connected to the differential count output of flip-flops 258–266. The differential count generator 254 has an add input and a subtract input. The add input is connected to WR_FIFO, the FIFO write strobe signal, and the subtract input is connected to RD_FIFO, the FIFO read signal, so that every write strobe assertion increments the difference count while every read operation decrements the difference count. RD_FIFO and WR_FIFO are OR'd by an OR gate 252. The output of gate 252 is provided to the select input of a multiplexer 256. The output of the differential count generator 254 is also connected to one input of the multiplexer 256, while the other input of the multiplexer 256 is connected to the outputs of the flip-flops 258–266. The output of the multiplexer 256 is provided to the inputs of flip-flops 258–266. The set input of flip-flops 258–266 are connected collectively to a logic high, while the reset inputs are collectively connected to the RESET* so that upon reset, the difference count is zero. Finally, all the clock inputs of flip-flops 258–266 are connected to CLK to be clocked.

Figure 7:
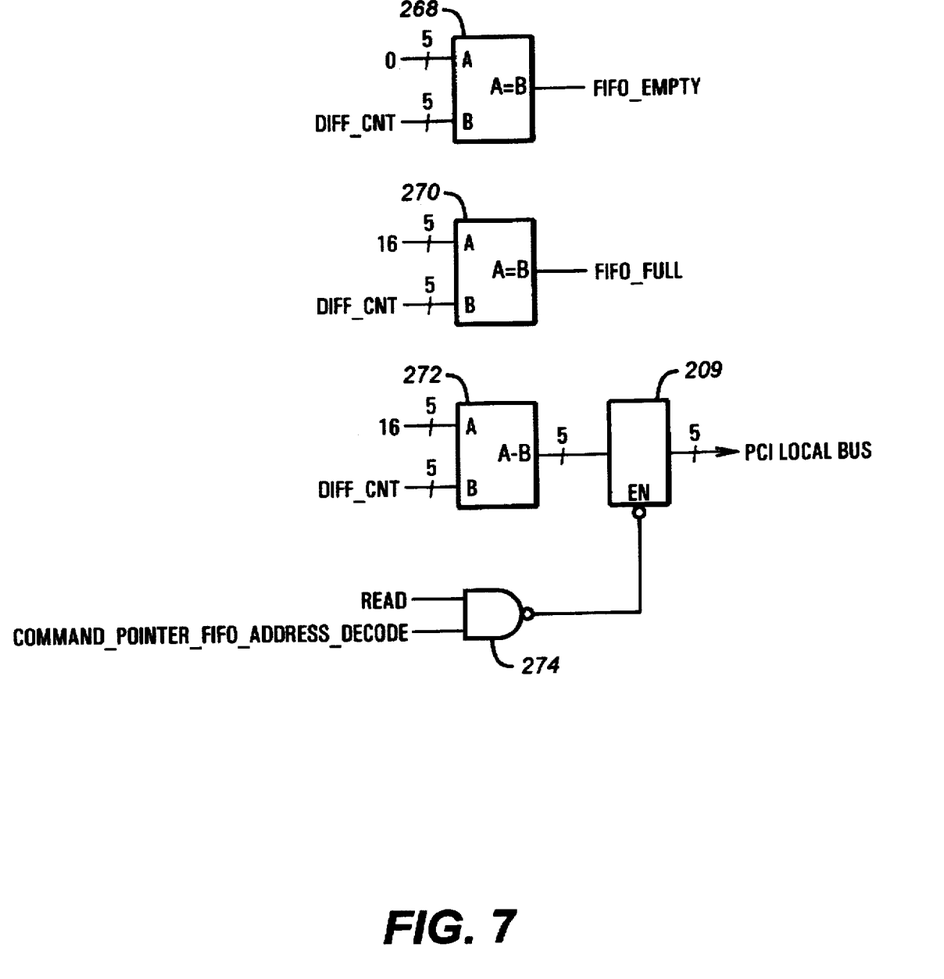
FIG. 7 is a block diagram of the FIFO empty, FIFO full, and the command pointer FIFO status register.

FIG. 7 discloses the circuits to compute the space available in the FIFO 134 as well as to detect the FIFO 134 empty and FIFO 134 full conditions. In FIG. 7, the DIFF_CNT value is provided from the flip-flops 258–266 to comparators 268 and 270 and to a subtractor 272. The comparator 268 compares the DIFF_CNT value with the value of zero. In the event of a match, the comparator 268 asserts a FIFO_EMPTY signal to indicate the DIFF_CNT value is equal to zero. Similarly, the comparator 270 compares DIFF_CNT value with the value of sixteen, the maximum FIFO depth in the preferred embodiment. In the event of a match, the comparator 270 asserts a FIFO_FULL signal to indicate that the FIFO 134 cannot accept any more data. The DIFF_CNT value is also provided to a subtractor 272 which subtracts the difference value from the maximum FIFO depth of sixteen in the preferred embodiment. The output from the subtractor 272 is provided to the status register 209 whose output is enabled onto the PCI local bus whenever the FIFO status register 209 is read. The status register 209 is enabled when a READ signal, indicating a PCI read operation, and a COMMAND_POINTER_FIFO_ADDRESS_DECODE signal, a decoded signal indicating that the bus master has selected the CP FIFO register, are asserted to a NAND gate 274. The output of the NAND gate 274 is provided to the low-going enable input of the buffer 209 to drive the value of the remaining FIFO space count onto the PCI local bus 102 for the bus master to read.

Figure 8:
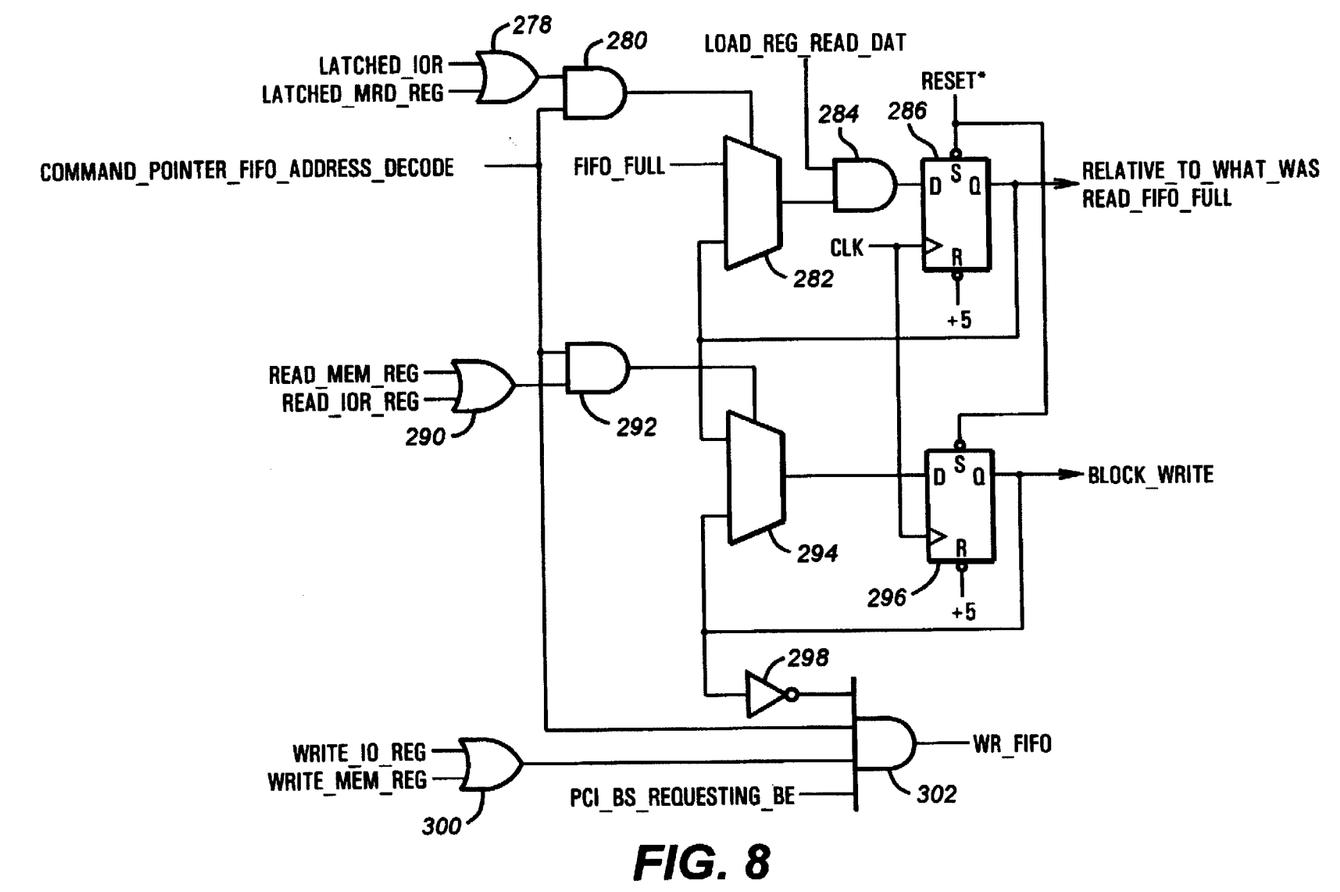
FIG. 8 is a block diagram of the lock exchange circuit for the command pointer FIFO of FIG. 3.

Turning to FIG. 8, the circuit for providing the write blocking signals to the memory 200 during a locked exchange cycle is disclosed. In FIG. 8, LATCHED_IOR and LATCHED_MRD_REG signals are provided to an OR gate 278 to decode an I/O or memory read operation. The output of the OR gate 278 is connected to the input of an AND gate 280, whose other input is connected to COMMAND_POINTER_FIFO_ADDRESS_DECODE, a decoded signal indicating that a bus master is selecting the CP FIFO 134. The output of the AND gate 280 is provided to the select input of a multiplexer 282. One input of the multiplexer 282 is connected to the FIFO_FULL signal of FIG. 7 while the other input is connected to the output of a flip-flop 286, which is the RELATIVE_TO_WHAT_WAS_READ_FIFO_FULL signal. Thus, when a read is directed to the CP FIFO register, FIFO_FULL is gated to an AND gate 284. Otherwise, RELATIVE_TO_WHAT_WAS_READ_FIFO_FULL is looped back. The output from the multiplexer 282 is provided to one input of the AND gate 284, while the other input of the AND gate is connected to LOAD_REG_READ_DATA, a signal from a PCI bus state machine indicating a data read operation is occurring. Finally, the output of the AND gate 284 is connected to the input of the flip-flop 286. The reset signal RESET* is connected to the set input so that, after reset, the FIFO 134 is set up to be full. The flip-flop 286 is clocked by the CLK signal.

The circuit for blocking the write strobe signal will now be discussed. In FIG. 8, READ_MEM_REG and READ_IOR_REG signals are provided to an OR gate 290 to decode a register read. The output of the gate 290 is provided to one input of an AND gate 292, while the other input of the AND gate 292 is connected to the COMMAND_POINTER_FIFO_ADDRESS_DECODE signal. The output of the AND gate 292 is connected to the select input of a multiplexer 294. One input of the multiplexer 294 is the RELATIVE_TO_WHAT_WAS_READ_FIFO_FULL signal, while the other input is connected to BLOCK_WRITE, the output of a flip-flop 296. The output of the multiplexer 294 is provided to the input of the flip-flop 296, while the output of the flip-flop 296 is provided to the input of the multiplexer 294 as the block write signal.

The reset input of flip-flops 286 and 296 are tied to a logic high signal, while the set inputs of flip-flops 286 and 296 are tied to the RESET* signal to clear both flip-flops upon reset. The flip-flop 296 is clocked by the CLK signal.

The output of the flip-flop 296 is connected to the input of an inverter 298, whose output is provided to one input of an AND gate 302. The COMMAND_POINTER_FIFO_ADDRESS_DECODE signal is provided as an input to the AND gate 302. The WRITE_IO_REG signal and the WRITE_MEM_REG signals are connected to an OR gate 300 whose output is connected to one input of the AND gate 302 to indicate that a write operation is directed to the CP FIFO register. Finally, PCI_BS_REQUESTING_BE, a decoded PCI bus request enable signal is also provided to one input of the AND gate 302 to further decode the write operation. The AND gate 302 generates the WR_FIFO signal. Thus, when the FIFO 134 was full at the time the CP FIFO register was read, the WRITE_STROBE signal is disabled until the next time the CP FIFO register is read and the FIFO 134 is not full. Thus, the FIFO 134 cannot be written into during the locked exchange operation when the FIFO 134 is full.

Figure 9:
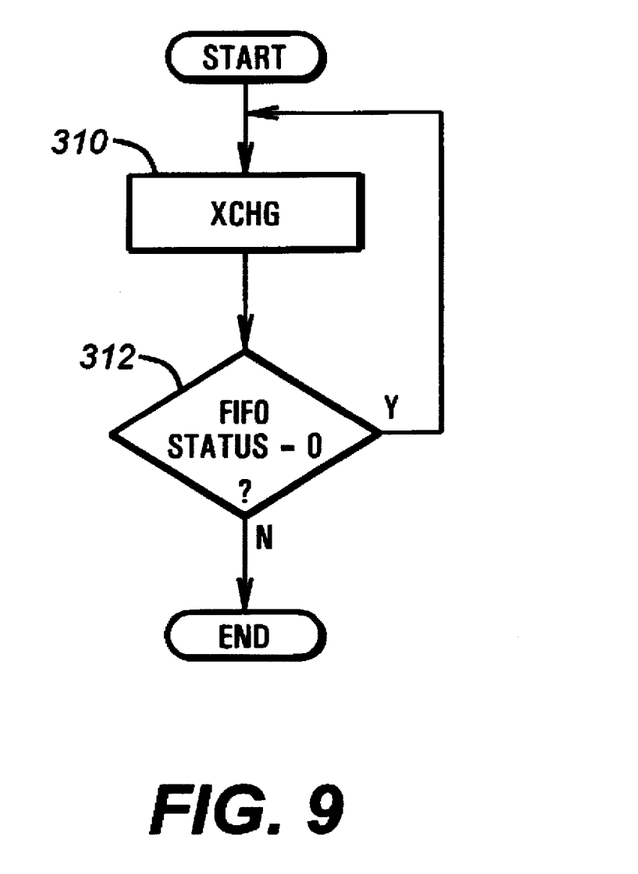
FIG. 9 is a flowchart of a procedure to access the command pointer FIFO register.

FIG. 9 illustrates the use of the exchange instruction in conjunction with the locked exchange FIFO 134. This process involves an exchange XCHG instruction at step 310 which incorporates a read operation of the CP FIFO register in step 310 immediately followed by a write operation to the CP FIFO register, with the read and write operations locked due to the nature of the exchange operation. The bus master exchange instruction will be to exchange the command pointer value with the value in the FIFO 134. The use of the exchange operation is particularly efficient because the bus master can poll the CP FIFO register and write the command pointer in one step. The locked exchange circuitry of the FIFO 134 ignores any write operation that follows a read of a zero value from the CP FIFO register. When the locked exchange is complete, the bus master examines the data that was read in step 312 and determines if the FIFO 134 was not full, as indicated by a non-zero value. A value of zero indicates that a submission was not successful and must be tried again. A value of non-zero indicates that there was room in the FIFO 134 and that the submission was successful.

Thus the multiple steps of the prior art to check the full state of the FIFO and then write data if not full are replaced by a single exchange operation, with the write inhibiting nature until a non-full read occurs ensuring that data is not improperly written. By then allowing the use of an exchange operation, multiple bus masters need not use a semaphore to share the FIFO because of the locked nature of the exchange operation.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A queue for sequentially storing data from a producer and providing said data to a consumer, said producer generating a write strobe signal, said consumer generating a read strobe signal, said queue comprising:

a memory having a memory write strobe input for receiving a memory write strobe signal and a read strobe input for receiving said read strobe signal from said consumer, said memory storing data upon receipt of said memory write strobe signal, said memory providing data to said consumer upon receipt of said read strobe signal, said memory having a memory capacity;

a memory full detector having a read input and a write input respectively coupled to said read strobe signal from said consumer and said write strobe signal from said producer and having a full output, said memory full detector asserting said full output when the difference between the number of said read and write strobe signal assertions equals said memory capacity; and a write enable generator having a write strobe input for receiving said write strobe signal from said producer, a full input coupled to said full output, and a write strobe output providing a write strobe signal connected to said memory write strobe input, said write enable generator blocking the write strobe signal from said producer to said memory when said full output is asserted and passing the write strobe signal from said producer to said memory when said full output is negated.

2. The queue of claim 1, wherein said memory full detector further comprises:

a difference counter having a read input and a write input respectively coupled to said read and write strobe signals, said difference counter having difference outputs for storing a difference value, said difference counter decrementing the difference outputs on each assertion of said read strobe signal and incrementing the difference outputs on each assertion of said write strobe signal; and a comparator having an input coupled to said difference outputs and having an output coupled to said full output, said comparator asserting said full output when said difference value equals said memory capacity.

3. The queue of claim 2, wherein said difference counter includes an adder/subtractor having an input preset to one.

4. The queue of claim 2, wherein said difference counter includes a subtractor having first inputs coupled to said memory capacity and second inputs coupled to said difference outputs, said subtractor having remaining space outputs for providing a remaining space signal, said subtractor subtracting said difference outputs from said memory capacity to generate said remaining space signal.

5. The queue of claim 4, wherein said producer generates a read strobe signal, the queue further comprising:

a status register having a producer read input strobe for receiving said read strobe signal from said producer and status outputs for presenting a status signal, said status register presenting said status signal to said producer upon receipt of said producer read input strobe.

6. The queue of claim 5, wherein said status signal reflects the remaining space in said queue.

7. The queue of claim 5, wherein said memory and said status register are responsive to an address value and wherein said address values for write operations to said memory and for read operations from said status register are the same.

8. The queue of claim 5, wherein said write enable generator blocks said write strobe signal from said producer to said memory when said full output is asserted after said status register has presented said status signal to said producer.

9. The queue of claim 5, wherein said write enable generator passes said write strobe signal from said producer to said memory when said full output is negated after said status register has presented said status signal to said producer.

10. The queue of claim 1, wherein said memory has write address inputs for receiving a write address signal, the queue further comprising a write address generator having a write strobe input for receiving said write strobe signal and having write address outputs coupled to said write address inputs for providing a write address signal to said memory, said write address generator incrementing the value of said write address signal upon receipt of said memory write strobe signal.

11. The queue of claim 1, wherein said memory has read address inputs for receiving a read address signal, the queue further comprising a read address generator having a read strobe input for receiving said read strobe signal and having read address outputs coupled to said read address inputs for providing a read address signal to said memory, said read address generator incrementing the value of said read address signal upon receipt of said read strobe signal.

12. A computer system comprising:

a producer generating a write strobe signal when providing data;

a consumer generating a read strobe signal when requesting data; and a queue connected to said producer and said consumer, said queue sequentially storing data from said producer and providing data to said consumer, said queue including:

a memory having a memory write strobe input for receiving a memory write strobe signal and a read strobe input for receiving said read strobe signal from said consumer, said memory storing data upon receipt of said memory write strobe signal, said memory providing data to said consumer upon receipt of said read strobe signal, said memory having a memory capacity;

a memory full detector having a read input and a write input respectively coupled to said read strobe signal from said consumer and said write strobe signal from said producer and having a full output, said memory full detector asserting said full output when the difference between the number of said read and write strobe signal assertions equals said memory capacity; and a write enable generator having a write strobe input for receiving said write strobe signal from said producer, a full input coupled to said full output, and a write strobe output providing a write strobe signal connected to said memory write strobe input, said write enable generator blocking the write strobe signal from said producer to said memory when said full output is asserted and passing the write strobe signal from said producer to said memory when said full output is negated.

13. The computer system of claim 12, wherein said memory full detector further comprises:

a difference counter having a read input and a write input respectively coupled to said read and write strobe signals, said difference counter having difference outputs for storing a difference value, said difference counter decrementing the difference outputs on each assertion of said read strobe signal and incrementing the difference outputs on each assertion of said write strobe signal; and a comparator having an input coupled to said difference outputs and having an output coupled to said full output, said comparator asserting said full output when said difference value equals said memory capacity.

14. The computer system of claim 13, wherein said difference counter includes an adder/subtractor having an input preset to one.

15. The computer system of claim 13, wherein said difference counter includes a subtractor having first inputs coupled to said memory capacity and second inputs coupled to said difference outputs, said subtractor having remaining space outputs for providing a remaining space signal, said subtractor subtracting said difference outputs from said memory capacity to generate said remaining space signal.

16. The computer system of claim 15, wherein said producer generates a read strobe signal, the queue further comprising:

a status register having a producer read input strobe for receiving said read strobe signal from said producer and status outputs for presenting a status signal, said status register presenting said status signal to said producer upon receipt of said producer read input strobe.

17. The computer system of claim 16, wherein said status signal reflects the remaining space in said queue.

18. The computer system of claim 16, wherein said memory and said status register are responsive to an address value and wherein said address values for write operations to said memory and for read operations from said status register are the same.

19. The computer system of claim 16, wherein said write enable generator blocks said write strobe signal from said producer to said memory when said full output is asserted after said status register has presented said status signal to said producer.

20. The computer system of claim 16, wherein said write enable generator passes said write strobe signal from said producer to said memory when said full output is negated after said status register has presented said status signal to said producer.

21. The computer system of claim 12, wherein said memory has write address inputs for receiving a write address signal, the queue further comprising a write address generator having a write strobe input for receiving said write strobe signal and having write address outputs coupled to said write address inputs for providing a write address signal to said memory, said write address generator incrementing the value of said write address signal upon receipt of said memory write strobe signal.

22. The computer system of claim 12, wherein said memory has read address inputs for receiving a read address signal, the queue further comprising a read address generator having a read strobe input for receiving said read strobe signal and having read address outputs coupled to said read address inputs for providing a read address signal to said memory, said read address generator incrementing the value of said read address signal upon receipt of said read strobe signal.

23. A disk controller comprising:

a producer generating a write strobe signal when providing data;

a consumer generating a read strobe signal when requesting data; and a queue connected to said producer and said consumer, said queue sequentially storing data from said producer and providing said data to said consumer, said queue including:

a memory having a memory write strobe input for receiving a memory write strobe signal and a read strobe input for receiving said read strobe signal from said consumer, said memory storing data upon receipt of said memory write strobe signal, said memory providing data to said consumer upon receipt of said read strobe signal, said memory having a memory capacity;

a memory full detector having a read input and a write input respectively coupled to said read strobe signal from said consumer and said write strobe signal from said producer and having a full output, said memory full detector asserting said full output when the difference between the number of said read and write strobe signal assertions equals said memory capacity; and a write enable generator having a write strobe input for receiving said write strobe signal from said producer, a full input coupled to said full output, and a write strobe output providing a write strobe signal connected to said memory write strobe input, said write enable generator blocking the write strobe signal from said producer to said memory when said full output is asserted and passing the write strobe signal from said producer to said memory when said full output is negated.

24. The disk controller of claim 23, wherein said memory full detector further comprises:

a difference counter having a read input and a write input respectively coupled to said read and write strobe signals, said difference counter having difference outputs for storing a difference value, said difference counter decrementing the difference outputs on each assertion of said read strobe signal and incrementing the difference outputs on each assertion of said write strobe signal; and a comparator having an input coupled to said difference outputs and having an output coupled to said full output, said comparator asserting said full output when said difference value equals said memory capacity.

25. The disk controller of claim 24, wherein said difference counter includes an adder/subtractor having an input preset to one.

26. The disk controller of claim 24, wherein said difference counter includes a subtractor having first inputs coupled to said memory capacity and second inputs coupled to said difference outputs, said subtractor having remaining space outputs for providing a remaining space signal, said subtractor subtracting said difference outputs from said memory capacity to generate said remaining space signal.

27. The disk controller of claim 26, wherein said producer generates a read strobe signal, the queue further comprising:
a status register having a producer read input strobe for receiving said read strobe signal from said producer and status outputs for presenting a status signal, said status register presenting said status signal to said producer upon receipt of said producer read input strobe.

28. The disk controller of claim 27, wherein said status signal reflects the remaining space in said queue.

29. The disk controller of claim 27, wherein said memory and said status register are responsive to an address value and wherein said address values for write operations to said memory and for read operations from said status register are the same.

30. The disk controller of claim 27, wherein said write enable generator blocks said write strobe signal from said producer to said memory when said full output is asserted after said status register has presented said status signal to said producer.

31. The disk controller of claim 27, wherein said write enable generator passes said write strobe signal from said producer to said memory when said full output is negated after said status register has presented said status signal to said producer.

32. The disk controller of claim 23, wherein said memory has write address inputs for receiving a write address signal, the queue further comprising a write address generator having a write strobe input for receiving said write strobe signal and having write address outputs coupled to said write address inputs for providing a write address signal to said memory, said write address generator incrementing the value of said write address signal upon receipt of said memory write strobe signal.

33. The disk controller of claim 23, wherein said memory has read address inputs for receiving a read address signal, the queue further comprising a read address generator having a read strobe input for receiving said read strobe signal and having read address outputs coupled to said read address inputs for providing a read address signal to said memory, said read address generator incrementing the value of said read address signal upon receipt of said read strobe signal.

34. A method for sequentially storing data from a producer into a memory, said memory having a write strobe input for receiving a write strobe signal, said memory storing data upon receipt of said write strobe signal, said method comprising the steps of:
receiving a status read from said producer to said memory;
determining an available space count associated with said memory and providing said available space count to said producer in response to said status read;
receiving write data and a write strobe signal from said producer; and
blocking said write strobe signal from said memory when said available space count is zero and otherwise passing the write strobe signal from said producer to said memory to store said write data.

35. The method of claim 34, wherein said determining step further comprises the step of latching said available space count.

36. The method of claim 34, wherein said receiving a status read step and said receiving write data and a write strobe signal step are responsive to an address value and wherein said address values for said receiving steps are the same.

37. The method of claim 34, wherein said memory has a read strobe input for receiving a read strobe signal, the method further comprising the step of providing said data from said memory to a consumer upon receipt of a read strobe signal from said consumer.

38. The method of claim 37, wherein said memory has a memory capacity and wherein said determining step further comprises the steps of:
counting a difference between said read strobe signal assertion and said write strobe signal assertion;
comparing said difference with said memory capacity; and
latching the result of said comparing step.

39. The method of claim 38, wherein said determining step further comprises the step of subtracting said difference from said memory capacity to generate said available space count.

40. The method of claim 34, wherein said memory has write address inputs for receiving a write address signal, the method further comprising the step of incrementing said write address signal upon receipt of said write strobe signal.

41. The method of claim 34, wherein said memory has read address inputs for receiving a read address signal, the method further comprising the step of incrementing said read address signal upon receipt of said read strobe signal.

42. A method for sequentially storing data from a producer into a locked exchange memory, said method comprising the steps of:
reading an available space count from said locked exchange memory;
immediately writing said data to said locked exchange memory; and
determining whether said locked exchange memory has accepted said data, wherein said reading and immediately writing steps are responsive to an address value and wherein said address values for said reading and immediately writing steps are the same.

43. The method of claim 42, wherein said determining step further comprises the step of comparing said available space count with zero.

* * * * *